United States Patent
Al-Gharaibeh et al.

(10) Patent No.: US 11,468,694 B1
(45) Date of Patent: Oct. 11, 2022

(54) SYSTEMS AND METHODS FOR DOCUMENT IMAGE PROCESSING USING NEURAL NETWORKS

(71) Applicant: ARCHITECTURE TECHNOLOGY CORPORATION, Eden Prairie, MN (US)

(72) Inventors: Jafar Al-Gharaibeh, Eden Prairie, MN (US); William Estey, Eden Prairie, MN (US); Paul Nicotera, Eden Prairie, MN (US)

(73) Assignee: ARCHITECTURE TECHNOLOGY CORPORATION, Eden Prairie, MN (US)

(*) Notice: Subject to any disclaimer, the term of this patent is extended or adjusted under 35 U.S.C. 154(b) by 2 days.

(21) Appl. No.: 17/093,138

(22) Filed: Nov. 9, 2020

Related U.S. Application Data

(63) Continuation of application No. 16/168,748, filed on Oct. 23, 2018, now Pat. No. 10,832,046.

(51) Int. Cl.
| | |
|---|---|
| G06V 10/30 | (2022.01) |
| G06V 30/40 | (2022.01) |
| G06T 5/00 | (2006.01) |
| G06N 3/04 | (2006.01) |
| G06F 40/40 | (2020.01) |
| G06N 3/08 | (2006.01) |
| G06V 30/10 | (2022.01) |

(52) U.S. Cl.
CPC .............. *G06V 30/40* (2022.01); *G06F 40/40* (2020.01); *G06N 3/04* (2013.01); *G06N 3/08* (2013.01); *G06T 5/002* (2013.01); *G06V 10/30* (2022.01); *G06V 30/10* (2022.01)

(58) Field of Classification Search
CPC ........ G06K 9/0042; G06K 9/40; G06F 40/40; G06N 3/04; G06N 3/08; G06T 5/002
See application file for complete search history.

(56) References Cited

U.S. PATENT DOCUMENTS

| | | | |
|---|---|---|---|
| 11,205,236 B1* | 12/2021 | Smith | G06Q 30/0631 |
| 2001/0037203 A1* | 11/2001 | Satoh | G01C 21/36 704/257 |
| 2009/0022397 A1* | 1/2009 | Nicholson | G06V 30/164 382/272 |
| 2014/0310613 A1 | 10/2014 | Megiddo et al. | |
| 2017/0266558 A1* | 9/2017 | Rath | A63F 13/60 |
| 2018/0103243 A1 | 4/2018 | Lee et al. | |
| 2018/0114096 A1* | 4/2018 | Sen | G06T 5/002 |
| 2018/0225808 A1* | 8/2018 | Chakraborty | G06T 11/60 |
| 2018/0286425 A1 | 10/2018 | Baek et al. | |

(Continued)

OTHER PUBLICATIONS

Jafar Al-Gharaibeh et al., ATC-NY, A17-142, A173-142-0025, FLIP document, Title: Feedback Loop Image Pre-Processing for OCR (FLIP), Architecture Technology Corporation, published Oct. 25, 2017, 24 pages.

*Primary Examiner* — Sam Bhattacharya
(74) *Attorney, Agent, or Firm* — Foley & Lardner LLP

(57) ABSTRACT

Disclosed herein are embodiments of an optical character recognition pre-processing software system, which is integrated into a language translation system to provide automated cleaning and correction of noisy and degraded document images to enable seamless and efficient optical character recognition processing and machine translation of information within the document images.

20 Claims, 4 Drawing Sheets

(56) References Cited

U.S. PATENT DOCUMENTS

| | | | |
|---|---|---|---|
| 2019/0095709 A1* | 3/2019 | Hara | G06V 20/62 |
| 2019/0171936 A1* | 6/2019 | Karras | G06N 3/084 |
| 2019/0188848 A1* | 6/2019 | Madani | G16H 10/60 |
| 2019/0209867 A1* | 7/2019 | Sun | G16H 30/20 |
| 2019/0289362 A1 | 9/2019 | Kalish | |
| 2019/0311194 A1* | 10/2019 | Zhuravlev | G06K 9/6227 |
| 2020/0020097 A1 | 1/2020 | Do et al. | |
| 2021/0133510 A1* | 5/2021 | Boulanger | G06K 9/6262 |

* cited by examiner

SYSTEMS AND METHODS FOR DOCUMENT IMAGE PROCESSING USING NEURAL NETWORKS

CROSS-REFERENCE TO RELATED APPLICATION

This application is a continuation of U.S. application Ser. No. 16/168,748, entitled "Systems and Methods for Processing Document Images," filed Oct. 23, 2018, which is incorporated by reference in its entirety.

TECHNICAL FIELD

This application relates generally to the field of character recognition systems and, more specifically, to systems and methods for pre-processing a document image prior to recognition of characters in the document image.

BACKGROUND

A number of optical character recognition (OCR) systems are known in the art, which are widely used in various applications to convert images of documents, sales receipts, and other text-containing information into digital character sequences. Typically, such optical systems comprise an apparatus for scanning a page of printed text and then performing a character recognition process on a bit-mapped image of the text. The characters may then be stored in a file on a computer system for processing by a word processor or the like. Some conventional OCR systems comprise a hand-held scanner for scanning a page. In such conventional OCR systems, the individual performing the scan sweeps the hand-held device over printed text on the page and attempts to avoid scanning graphics or non-text portions of the page.

Conventional OCR systems have been used to scan and read contents of relatively clean document images in different languages. However, it has been seen that performance and accuracy of the conventional OCR systems is significantly reduced when processing low quality and noisy document images rather than clean document images. Consequently, there has been a significant need to improve accuracy of the OCR systems when processing low quality and noisy document images.

In recent times, machine learning techniques, such as artificial neural networks, have been used to model and automate a task of preparing clean document images from low quality and noisy document images in order to maximize performance and accuracy of the conventional OCR systems. However, it has been seen that a complexity of a neural network model required to automatically clean noisy document images with many different types of degradation, text formats, and writing systems quickly becomes intractable for conventional machine learning approaches and computing resources. The task of preparing clean document images from the low quality and noisy document images is further complicated by a potential presence of non-text information, such as annotations and figures within the document images.

Some of the currently available conventional OCR systems have tried to incorporate image pre-processing functionality to pre-process the low quality and noisy document images to generate the clean document images, but such functionality is typically constrained by available computing resources and machine learning libraries of the conventional OCR systems. As a result, OCR pre-processing techniques typically handle only a limited range of document image defects, text formats, and writing systems. Furthermore, to avoid removing desired information from the document images, such as annotations and figures, conventional OCR systems tend to operate conservatively, and performing only the most obvious and straightforward corrective actions. Thus, increasing the OCR system accuracy for highly degraded images, especially for document images with less common text formats and writing systems, remains a technical problem yet to be solved.

SUMMARY

What is therefore desired are systems and methods to improve accuracy of optical character recognition (OCR) processing for noisy and degraded document images. Disclosed herein are OCR pre-processing systems, which may be integrated into a language translation system to provide automated cleaning and correction of the noisy and degraded document images to enable seamless and automatic recognition of different languages and characters in the document images.

More particularly, embodiments disclosed herein describe a system comprising a feedback loop image pre-processing for an optical character recognition (OCR) application. The system may integrate conditional computation and deep learning to provide an automated pre-processing of a document image. The pre-processing functionality provided by the system may solve the modeling complexity required for pre-processing relevant types of writing systems, text formats, and noise sources within the document images based on collection of neural networks, called a mixture of refiners, where each refiner may learn to pre-process a targeted category of document imagery. The system may select an optimal and appropriate pre-processing refiner using a specialized gating neural network that is specifically trained to choose a refiner that will maximize accuracy of an OCR system. The system may scale efficiently with model complexity, adding more refiners as needed to pre-process newly encountered document image types. By integrating the pre-processing functionality with a language translation tool, the system may index, search, and extract intelligence from document images that were previously too degraded for the OCR processing.

In an embodiment, a computer implemented method comprises receiving, by a computer, a raw document image containing image noise and one or more distortions; executing, by the computer, a sliding window application configured to select a portion of the raw document image; transmitting, by the computer, the selected portion of the raw document image to a gating neural network hosted by the computer; selecting, by the gating neural network executed by the computer, a refiner neural network hosted by the computer based on one or more optical characteristics of the selected portion of the raw document image; pre-processing, by the selected refiner neural network executed by the computer, the selected portion of the raw document image to remove the image noise and the one or more distortions thereby generating a clean document image portion; stitching, by the computer, the clean document image portions with other clean document image portions to generate a clean document image; and transmitting, by the computer, the clean document image to a character recognition device such that the character recognition device recognizes one or more characters in the clean document image.

In another embodiment, a system comprises a non-transitory storage medium configured to store a gating neural network and a plurality of refiner neural networks; a processor coupled to the non-transitory storage medium and configured to: receive a raw document image containing image noise and one or more distortions; execute a sliding window application configured to select a portion of the raw document image; execute the gating neural network to: receive the selected portion of the raw document image from the computer; select a refiner neural network of the plurality of neural networks based on one or more optical characteristics of the selected portion of the raw document image, wherein the selected refiner neural network is configured to pre-process the selected portion of the raw document image to remove the image noise and the one or more distortions thereby generating a clean document image portion; stitch the clean document image portions with other clean document image portions to generate a clean document image; and transmit the clean document image to a character recognition device such that the character recognition device recognizes one or more characters in the clean document image.

BRIEF DESCRIPTION OF THE DRAWINGS

The accompanying drawings constitute a part of this specification and illustrate embodiments of the subject matter disclosed herein.

DETAILED DESCRIPTION

Figure 1:
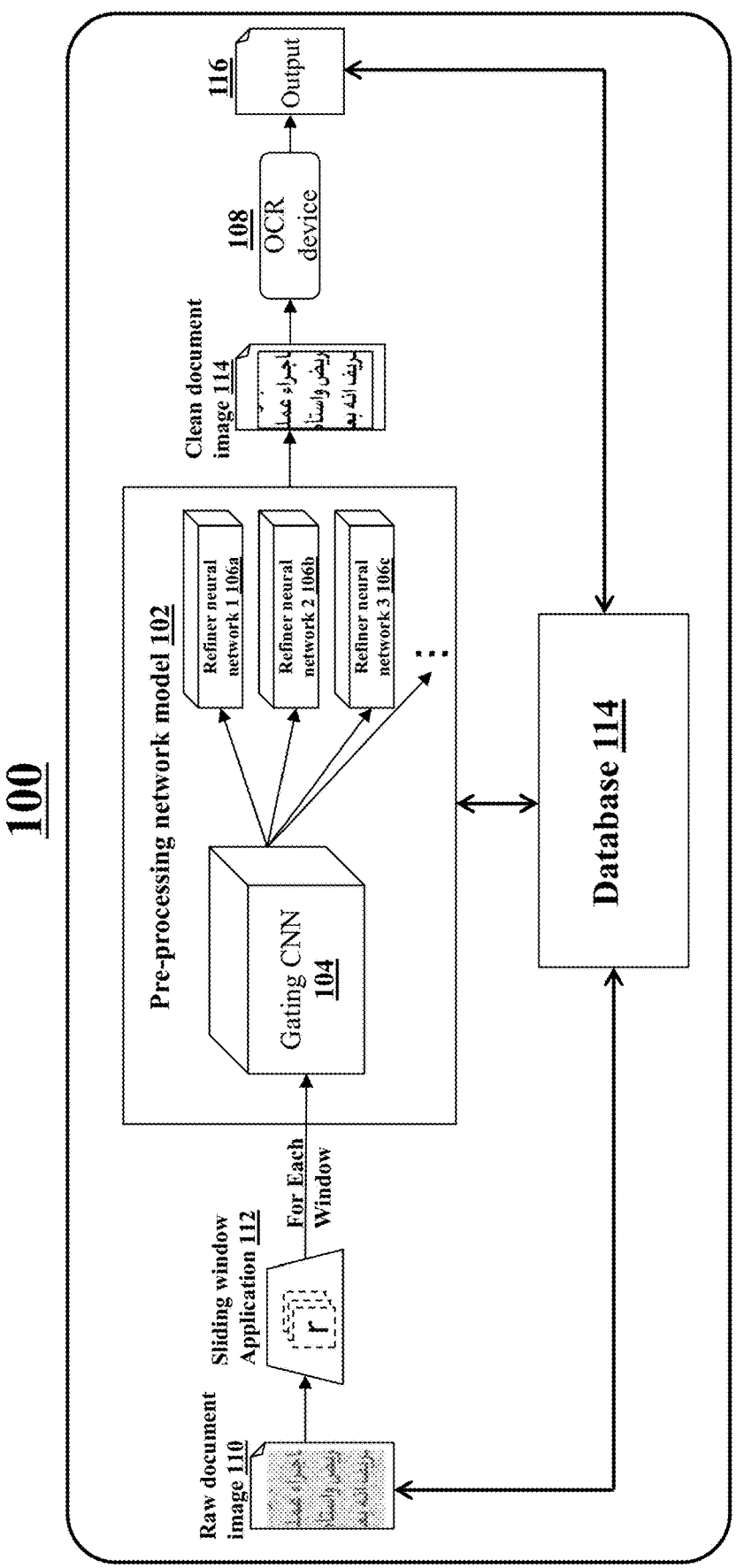
FIG. 1 illustrates a system for character recognition of a document image, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Optical character recognition (OCR) is an essential attribute for a language translation system. During a first step in text language translation of hard copy document images, an accurate rendition of original text within the hard copy document images is obtained for translation since degraded or noisy document images may make character recognition difficult and slower for OCR software application employed by the language translation system. Therefore, during a first step, the language translation system may remove noise from the hard copy document images and improve the appearance of the hard copy document images for high OCR accuracy, which may speed up the document images translation process and provide more precise translations. For instance, an advanced document image pre-processing system may clean-up document images to a degree that will allow the OCR applications to transcribe the document images at a higher level of accuracy. The pre-processing system may apply to all language scripts within the document images to remove noise and improve the appearance of document images for high OCR accuracy. The pre-processing system enables removal of noise and distortions from the document images such as speckle, watermarks, paper creases, stains, small holes, rough edges, lines on the paper, copier noise and streaks, and at the same time not change or degrade document image formatting such as font sizes and font formatting elements comprising underline, italic, and bold.

A pre-processing system disclosed herein may enhance performance of OCR systems integrated with language translation systems in various industrial applications. The pre-processing system for automated document image pre-processing may be modular and extensible, so the pre-processing software system may integrate efficiently with the OCR systems spanning a wide range of operational scales and workflow dynamics. The pre-processing system has application in digital media software products (e.g., a PDF reader), commercial OCR services, and digitization hardware (e.g., a document scanner).

FIG. 1 illustrates a system 100 that facilitates capture and accurate OCR of symbols and text when using low quality document images involving degraded symbols, text, and/or documents, which has been damaged or tainted in some manner, and the associated symbols more difficult to recognize.

A system 100 may include a pre-processing network model 102 comprising a gating convolutional neural network (CNN) model 104 (also referred to as a gating network model 104), a plurality of refiner neural networks 106a-106c (also referred to as a plurality of refiners 106), an OCR device 108, and multiple computing devices. The gating network model 104, the plurality of refiners 106, the OCR device 108, and the multiple computing devices may be connected to each other through a network. The examples of the network may include, but are not limited to, private or public LAN, WLAN, MAN, WAN, and the Internet. The network may include both wired and wireless communications according to one or more standards and/or via one or more transport mediums. The communication over the network may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g. a GSM (Global System for Mobile Communications), CDMA (Code Division Multiple Access), EDGE (Enhanced Data for Global Evolution) network.

In operation, a camera (not shown) may be configured for capturing an image of an object of interest (e.g., PDF document written in one or more languages) and generating a raw document image 110. The camera may be an add-on equipment that is external to a computing device (not shown) of a language translation system or any other system, and is specialized for the capture of desired images of the object of interest. In order to optimize image capture conditions such as conjugate distance and illumination, the camera may include hardware for holding the object of interest at a particular distance and angle from the camera. The raw document image 110 is then fed to a pre-processing network model 102. The pre-processing network model 102 performs pre-processing of the raw document image 110 to maximize performance and accuracy of output of an OCR device 108. In some embodiments, the pre-processing network model 102 may be integrated into the OCR device 108, which may be an independent component or a part of a language translation system. In some embodiments, the pre-processing network model 102 may be a separate component and associated with the OCR device 108. The pre-processing network model 102 includes a gating network model 104 and a plurality of refiners 106, which may be machine learning network models. The gating network model 104 is a gatekeeper to select an optimal refiner 106 from the plurality of refiners 106 for each input raw document image 110 based on optical characteristics associated with the raw document image 110. The selected refiner 106 then pre-processes the raw document image 110 and provides an idealized, noise-free output, which is in the form of a clean document image 114. The clean document image 114 is then fed on to the OCR device 108 having OCR software installed thereon. The OCR device 108 then performs OCR processing on the clean document image 114 and provides an output 116. Output 116 is, for example, a display of a captured image as well as text data extracted from the image using the OCR software, such as the PDF document information organized into a format and a language that can be fed into available applications.

A pre-processing network model 102 is configured to produce a clean document image 114 from a raw document image 110 is flexible because its extensible collection of refiners 106 enables users of a system 100 to add new modeling capabilities after deployment of the pre-processing network model 102. The pre-processing network model 102 also has an ability to be dynamically controlled, enabling the users to balance speed versus accuracy. Also, the pre-processing network model 102 works independent of language of text within the raw document image 110, that is, the refiners 106 are applied based on objectives of pixel processing, enabling the pre-processing network model 102 to account for different characteristics between writing systems by adding new refiners 106 as needed.

Computing devices (not shown) interacting with the system 100 may be any computing and/or telecommunications device comprising a processor and capable of performing the various tasks and processes described herein, such as providing a GUI interface to a customer to interact with a customer-centric character recognition for performing character recognition process. Non-limiting examples of a computing device may include a user computer (e.g., desktop, laptop, server, tablet), or any other telecommunications or computing device used to communicate with enterprise services. The computing device may be, for instance, a desktop system with a webcam, a laptop with an integrated camera or any device with an integrated camera and enough processing power for pre-processing, character recognition, and language translation.

In some embodiments, a computing device may be any device allowing a user to interact with a webserver hosting one or more character recognition and language translation applications. In some embodiments, a computing device may interact with a webserver hosting one or more language translation applications. In some embodiments, a computing device may interact with a webserver hosting both character recognition and language translation applications. In some embodiments, a computing device may interact with a webserver hosting both a single application for both character recognition and language translation. The computing device may execute an Internet browser or local application that access the webserver in order access character recognition and/or language translation applications. The computing device may transmit credentials from user inputs to the webserver, from which the webserver may authenticate the user. One having skill in the art would appreciate that the computing device may comprise any number of input devices configured to receive any number of data inputs (e.g., mouse, keyboard, touchscreen, stylus), including various types of data inputs allowing for authentication, e.g., username, passwords, certificates, biometrics. One having skill in the art would also appreciate that the computing device may be any device comprising a processor and non-transitory machine-readable storage medium allowing the computing device to perform the various tasks and processes described herein.

As an example of the computing device operation, the computing device may execute a browser that accesses a webserver hosting a character recognition and/or language translation application that allows for users to perform character recognition and/or language translation process. Using the computing device, a user may select a particular software character recognition and/or language translation application on the user-centric web site. As the process proceeds, the computing device having a webcam or laptop camera is used to capture an image of an object of interest to provide a raw document image 110 (indicated by Arabic document). The camera may include processing capability for sharpening or edge enhancement. Additionally, the camera may be re-optimized to a closer fixed-focus position that provides sufficiently high raw document image 110 quality while facilitating the OCR and/or language translation task. Alternatively, camera may also be equipped with extended depth of field capabilities by using specialized modification of wave front phase. The computing device may then issue queries or instructions to a pre-processing network model 102 and OCR device 108 via the webpages generated by the webserver, which then instruct the pre-processing network model 102 and the OCR device 108 to perform various tasks, such as pre-processing, OCR, and and/or language translation. Raw document image 110 may be, for example, raw image data as captured by camera. The pre-processing network model 102 and the OCR device 108 are configured to perform a pre-processing routine on the raw document image 110 as well as to perform the OCR and/or language translation to produce output data 116. The output data 116 is fed into an external user device (not shown).

A user device may be any computing device comprising a processor and non-transitory machine-readable storage medium, and capable of performing various tasks and processes described herein during execution. Non-limiting examples of the user device may include a desktop computer, a server computer, a laptop computer, a mobile device, a tablet computer, and the like. The user device may include a display screen, which is configured to display the output data 116, which may be a text string, consisting of a string of characters that are drawn from a predefined alphabet. The display screen may be an LCD screen, computer monitor, or the like, which displays a graphical user interface for a user to edit the text string whenever required. The user may include an input device, such as a keyboard or touch or writable screen, and/or a cursor control device, such as mouse, trackball, or the like, for editing text string and for communicating user input information and command selections to the processor. The display screen and the input device may be directly linked to the user device, by a wired or wireless connection. In some embodiments, the user device may include a post-processing software program configured to perform a post-processing routine on the output data 116. The post-processing routine on the output data 116 may include language translation. The post-processing routine on the output data 116 may also include spelling correction. The post-processing routine on the output data 116 may also include format correction. The post-processing routine on the output data 116 may also include proof-reading.

A gating network model 104 is a machine learning model, which is trained to select an optimal and appropriate pre-processing refiner 106 that maximizes OCR accuracy when an OCR device 108 processes a raw document image 110. Initially, the gating network model 104 may perform an identity transformation of the raw document image 110 to determine whether the raw document image 110 already produces acceptable OCR accuracy, and if pre-processing of the raw document image 110 is even required or not. Upon determining that the pre-processing of the raw document image 110 is required, then the gating network model 104 may select an optimal and appropriate refiner 106 based on one or more optical characteristics such as language and quality of information of text within the raw document image 110. When there is no suitable refiner network model 106 is available for pre-processing the raw document image 110, then a new refiner network model 106 is trained to pre-process said raw document image 110. For example, if the language of information of the raw document image 110 is Spanish, and no refiner network model 106 is available for pre-processing the raw document image 110 of Spanish language, then a new refiner network model 106 is trained to pre-process documents of Spanish language using a dataset comprising documents of Spanish language of all types of image quality.

A processor of a system 100 may generate and execute a software program to automate a process of creating and training a gating network model 104 for an input training dataset. The training dataset may be provided from a previous task, which may consist of a set of pairings of each raw document image window with a refiner 106 that best and/or optimally pre-processed said window. The gating network model 104 learns to select an optimal refiner 106 corresponding to each raw document image window. Accordingly, the gating network model 104 is designed with P input nodes and E output soft max units, where P is the number of pixels in a raw document image window and E is the number of refiners 106. The gating network model 104 is also designed to efficiently process pixel data as input features, so that the gating network model 104 is configured to model selection process of the refiners 106. A variety of structural and learning parameter values may be experimented to find an effective design of the gating network model 104.

A refiner 106 is a machine learning model, which is configured to transform noisy raw document image 110 to remove an impact of image noise, image defects, and/or distortions on OCR accuracy. The refiner 106 is configured to model predefined categories of writing systems, text formats, and noise sources. Each refiner 106 is trained to remove all noise from the raw document image 110 within its category, while not removing any text or annotation information from the raw document image 110, and thus a clean document image 114 is generated. The refiner 106 is trained to generate idealized, noise-free document image for each training example from a ground truth text data. Each category of training data examples may include annotations in some idealized images, so that the refiner 106 may learn to preserve annotation features as part of their training.

A processor of a system 100 is configured to train a refiner 106 to support multiple writing systems, including, for example, Arabic and English. The refiner 106 may dynamically learn from new training documents stored in a database 114 and the processor may automatically add new refiners 106 as needed to accommodate new categories of writing systems, document text, and image noise.

During a training task of refiners 106, a processor of a system 100 may acquire a training dataset of representative language documents (such as Arabic and English documents) to generate automated document image pre-processing models, such as the refiners 106. Each representative document image may include: noisy image of a physical document, as scanned or photographed copy from a print copy; and text information providing a ground truth of textual content and annotations contained in the document images. One technique to train the refiner 106 is based on the processor analyzing the representative language documents in the training dataset, and then generate a pristine, noise-free image for each representative language document in the training dataset. The processor may capture high quality images representing ground truth rich text data, as rendered by a word processing application or a printer driver with multilingual support, such as Microsoft Word. These pristine images may include ground truth text information as well as any annotations that should be preserved during pre-processing by the refiners 106, such as underlined, bold, or italic characters. Furthermore, the processor may position text information in the noise-free document images at same locations or pixel coordinates as the corresponding noisy image training examples. These properties will enable the processor using the noisy and noise-free document image examples as input and ground truth data, respectively, for training the refiners 106.

A processor of a system 100 is configured to iteratively generate and train refiners 106 tailored to remove distortions and noise from a set of image documents contained in Arabic or any other language documents that include degraded regions. The processor may execute a sliding window application 112, which may be a software program/algorithm, to segment noisy document imagery into multiple sequential arrays of pixel data of a same size or different sizes that may serve as an input image window examples for training the refiners 106. The learning process of the refiners 106 is to reproduce the noise-free pixel data corresponding to each noisy input image segment. The processor may use one or more neural network designs and training techniques, such as a multilayer feed forward network trained with iterative back propagation of error and error gradient descent-based parameter updates to train the refiners 106. The processor may further use open source machine learning library with support for parallel processing, such as Apache Spark to train the refiners 106. To train the refiners 106, the processor may test with a variety of window sizes obtained using the sliding window application 112, neural network structures, regularization strategies, initialization methods, node activation functions, and weight update techniques to understand the interactions between various settings and their effects on behavior and performance of the refiners 106.

A processor of a system 100 may set learning capacity and structure of the refiners 106 to perform predictions quickly and achieve very high accuracy for a subset of raw input image segments, such as, examples of smudging or all areas with text containing a morphological characteristic. Accordingly, the resulting refiners 106 may serve as a template for training new refiners 106, which may be configured to learn other similarly scoped but very different raw document image pre-processing objectives.

The refiners 106 generated by the processor may be capable of accurately pre-processing a targeted subset of image segments and/or image windows within representative Arabic or other language documents. The refiners 106 may serve as an initial pre-processing refiner for the system 100. The refiners 106 is also a template for the automated, on-demand learning of new pre-processing refiners, which may be developed later. The targeted subset of the image segments and/or the image windows analyzed by the refiners 106 may be of a same size or different sizes. The gating network model 104 may select an optimal refiner 106 corresponding to each raw document image window for pre-processing the raw document image window while considering a context of an image area of the each raw document image window being refined and pre-processed. The selected refiner 106 may also utilize context information of the image area of the raw document image window to preprocess the target image area of the raw document image window. The refiners 106 may preprocess the target image area of the raw document image window to transform the targeted subset of the image segments and/or the image windows of the same or different sizes such that the area of pixels in transformed subset of image segments and/or image windows may differ from the area of pixels in each analyzed image segment and/or image window of the targeted subset of image segments and/or the image windows.

In some embodiments, a processor of a system 100 may generate and execute a software program to automate a process of creating and training a collection of refiners 106 for a raw input document training dataset. The automated creation process of the refiners 106 may include an OCR-driven feedback loop where a training cycle begins with at least one refiner 106 having an identity transformation feature present as a default pre-processing choice. For the task of the automated creation process, a refiner 106 model developed by a processor may be presented as another option in an initial collection of refiners 106. During a first iteration process, a processor may enable segmentation of all raw document images in a training dataset into several smaller image samples using a sampling method executed via a sliding window application 112. The processor may then use a range of window sizes and stride lengths between the raw document image samples. In some embodiments, a window size on an order of an average character dimensions may yield a balance of processing speed and accuracy. The processor may include all of the sampled raw document image windows in a training dataset, which requires pre-processing. The sampled raw document image windows may be of a same size or different sizes. During each training cycle, a processor may enable transformation of each raw document image window remaining in the training dataset by all available refiners 106, and an optimal refiner among refiners 106 is selected for that window as compared to the OCR results for the pristine version of that window. Any new refiners 106 window pairings may be used to update those refiners 106, and any raw document image windows that are successfully pre-processed by an updated refiner 106 are moved from the refiners 106 training dataset to the training data of a gating network model 104. If any image windows remain in the training dataset at the end of the training cycle, then a new refiner 106 is initialized and added to the collection of the refiners 106, and the training cycle is repeated until all raw document image windows in the training dataset have been successfully pre-processed.

OCR device 108 may receive a clean document image 114 from a refiner 106 to perform OCR processing of information within the clean document image 114. In some cases, the OCR device 108 may receive a clean document image 114 from a refiner 106 to perform OCR processing along with language translation of information within the clean document image 114. The OCR device 108 may include a computer having OCR neural network and/or OCR software installed therein to perform OCR and/or language translation process. In some embodiments, the OCR device 108 may be a scanner device having OCR neural network and/or OCR software installed therein to perform OCR and/or language translation process.

In operation, OCR device 108 receives incoming clean document image 114 from a refiner 106. The OCR device 108 then performs character recognition and/or language translation to translate electronic bit-maps, for example, representing incoming data in the clean document image 114 into computer-readable characters. The clean document image 114 may comprise machine generated characters or symbols or graphic elements such as picture elements of a photograph or may comprise human hand-written characters, symbols or graphic elements. The bit-maps may be digital representations of such data appearing in the clean document image 114. The density of bits in a contiguous cluster of bits of a bit-map portion may represent an alphabetic character or other symbol that may be computer recognizable. During the character recognition and/or language translation process of the clean document image 114, an OCR neural network and/or OCR software may locate a center position of all desired characters within a field of characters in the clean document image 114 such that the desired characters can be subsequently recognized using an appropriate classification process. The OCR device 108 may operate to translate each visual image of the bit-map into a symbol, character, or graphic.

Databases 114 are hosted on a system 100, and are capable of storing training datasets. The training datasets may be used to train a gating network model 104, a plurality of refiners 106, and other language translation models. The databases 114 may be in communication with a processor of a computing device of the system 100, where the processor is capable of executing the various commands of the system 100. In some embodiments, the databases 114 may be part of the computer. In some embodiments, the databases 114 may be a separate component in communication with the computer.

The databases 114 include various sub-databases where each sub-database is configured to store data of certain types. For instance, a first sub-database is configured to store a first dataset to train a gating network model 104. A second sub-database is configured to store a second dataset to train a plurality of refiners 106. A third sub-database is configured to store a third dataset to train language translation models. These sub-databases may be in communication with each other via a network and include a non-transitory machine-readable storage media capable of receiving, storing, updating training datasets stored in the databases 114. The databases 114 may have a logical construct of data files that are stored in non-transitory machine-readable storage media, such as a hard disk or memory, controlled by software modules of a database program (for example, SQL), and a database management system (DBMS) that executes the code modules (for example, SQL scripts) for various data queries and other management functions generated by the computer.

In some embodiments, a memory of the databases 114 may be a non-volatile storage device for storing threat information and/or corresponding alerts data and instructions, to be used by a processor of the computer. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of databases 114 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Figure 2:
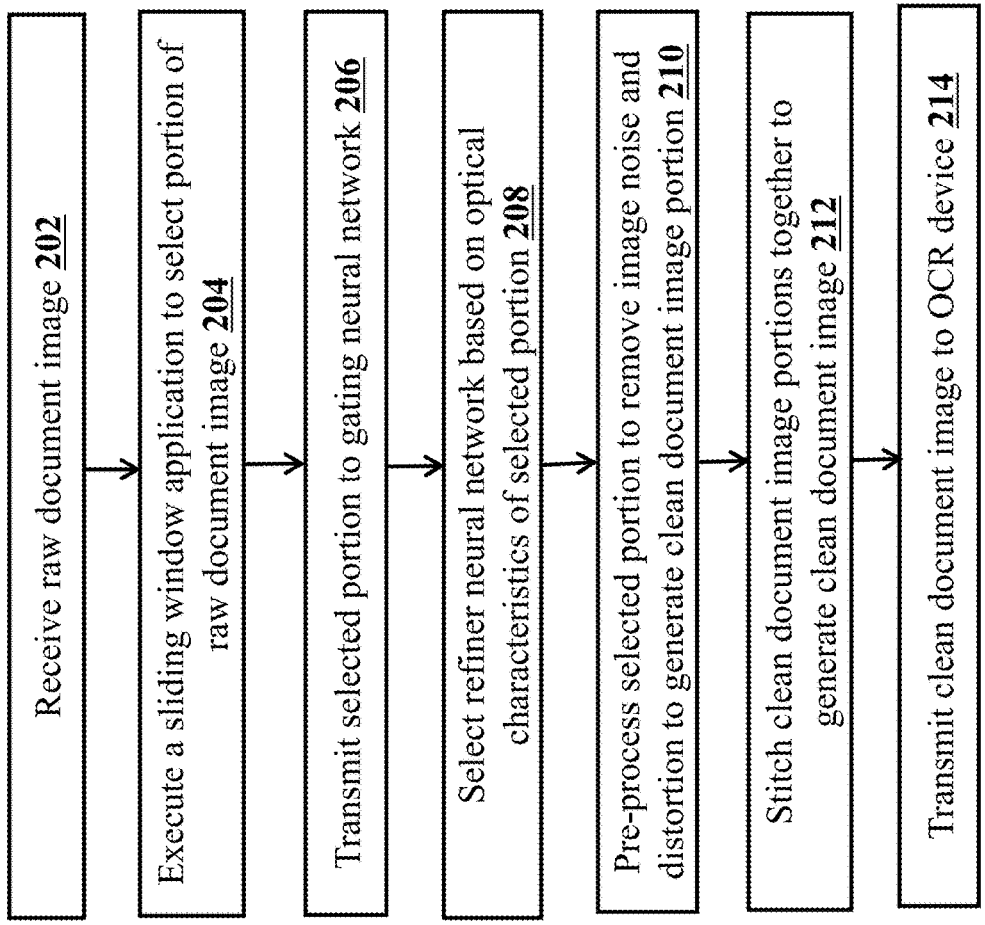
FIG. 2 illustrates a method for character recognition of a document image, according to an embodiment.

FIG. 2 shows a method for capture and accurate optical character recognition (OCR) of symbols and text when using low quality document images involving degraded symbols, text, and/or documents, which has been damaged or tainted in some manner, and the associated symbols more difficult to recognize, according to a method 200. The method 200 shown in FIG. 2 comprises execution steps 200, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a single computer in this embodiment. However, one having skill in the art will appreciate that, in some embodiments, steps may be executed by any number of computers operating in a distributed computing environment. In some cases, a computer executing one or more steps may be programmed to execute various other, unrelated features, where such computer does not need to be operating strictly as the computer described herein.

In a first step 202, a computer may receive a raw document image containing image noise and one or more distortions from a second computing device. The raw document image may contain image noise and one or more distortions such as speckle, watermarks, paper creases, stains, small holes, rough edges, lines on the paper, copier noise and streaks.

In some embodiments, the computer may generate a request for a raw document image, and transmit the request to a second computing device, and the second computing device may then transmit the raw document image to the computer. The second computing device may be coupled to a camera, which captures the raw document image of an object of interest, and then transmits the raw document image to the computer via any suitable transmission method. In some embodiments, the computer may be coupled to a camera, which directly captures a raw document image of an object of interest for performing one or more character recognition tasks on information within the raw document image.

Upon capturing and/or receiving the raw document image, the computer may then parse the raw document image to identify a group of characters. Then the computer may compare the group of characters to pattern information representative of various characters related to letters of an alphabet and numbers. Based on the results of comparison, the computer may identity one or more types of alphabets within text of the raw document images. Then the computer may perform further processing to determine one or more languages associated with text in the raw document image using information associated with one or more types of alphabets within text of the raw document image. Upon determination of more than one language in the raw document image, the computer may digitally mark one or more portions in the raw document image containing different languages.

In a next step 204, the computer may select a portion of the raw document image using a sliding window application. The computer may execute a sliding window application/ program to select a window and/or portion of a document of the raw document image. In some embodiments, each window and/or portion of a document of the raw document image may be defined by a boundary between pixels of different intensity within the raw document image. In some embodiments, each window and/or portion of a document of the raw document image may be defined based on text within the portion in a different language.

In a next step 206, the computer may transmit selected portion of raw document image to a gating neural network hosted by the computer. The gating network model is a machine learning model, which is trained to select an optimal and appropriate pre-processing refiner that maximizes OCR accuracy when an OCR device processes the selected portion of the raw document image. The gating network model first performs an identity transformation of the raw document image. The identity transformation of the raw document image may be performed to determine whether the raw document image already produces acceptable OCR accuracy, and if pre-processing of the raw document image is even required or not.

In a next step 208, upon a gating neural network (executed by the computer) determining that pre-processing of raw document image is required, then the gating network model selects an optimal and appropriate refiner hosted by a computer. In some embodiments, the gating neural network may select the refiner based on one or more optical characteristics of the selected portion of the raw document image. One optical characteristic of the selected portion of the raw document image may include language of text within the selected portion of the raw document image. Another optical characteristic of the selected portion of the raw document image may include quality of the selected portion of the raw document image. The quality may correspond to image noise and distortions in the selected portion of the raw document image such as speckle, watermarks, paper creases, stains, small holes, rough edges, lines on the paper, copier noise and streaks. Yet another optical characteristic of the selected portion of the raw document image may include information associated with context area of the selected portion of the raw document image that is being refined and pre-processed.

In a next step 210, the gating network may select a refiner to operate on a selected portion of a raw document image then pre-process the selected portion of the raw document image to remove image noise and distortion, and thereby generating a clean document image portion from a raw document image portion. In some embodiments, the size of the selected portion of the raw document image used by the gating network may be larger than the size of the refiner. In some embodiments, the size of the selected portion of the raw document image used by the gating network may be smaller than the size of the refiner. The gating network may select a plurality of refiners to operate on a plurality of portions of a raw document image to pre-process the plurality of portions of the raw document image in order to remove image noise and distortion from each of the plurality of portions of the raw document, and thereby generating a plurality of clean document image portions from a plurality of raw document image portions.

Each refiner of the plurality of refiners is a machine learning model, which is configured to transform noisy raw document image portion to remove an impact of image noise, image defects, and/or distortions on OCR accuracy. Each refiner is configured to model predefined categories of writing systems, text formats, and noise sources with each raw document image portion. Each refiner is trained to remove all noise from the raw document image portion within its category, while not removing any text or annotation information from the raw document image portion, and thus a clean document image portion is generated. Each refiner may also pre-process and transform the raw document image portion of same or different sizes such that area of pixels in the pre-processed and transformed raw document image portion may differ from the area of pixels in the raw document image portion.

In a next step 212, the computer may stitch clean document image portions generated by all of refiners to generate a single clean document image. Upon generation of the clean document image, in a last step 214, the computer is configured to transmit the clean document image to a character recognition device, such as the OCR device 108 shown in FIG. 1. The character recognition device may then parse the clean document image into a group of symbols. The character recognition device may then compare the symbols to pattern information representative of various characters related to letters of an alphabet and numbers.

Figure 3:
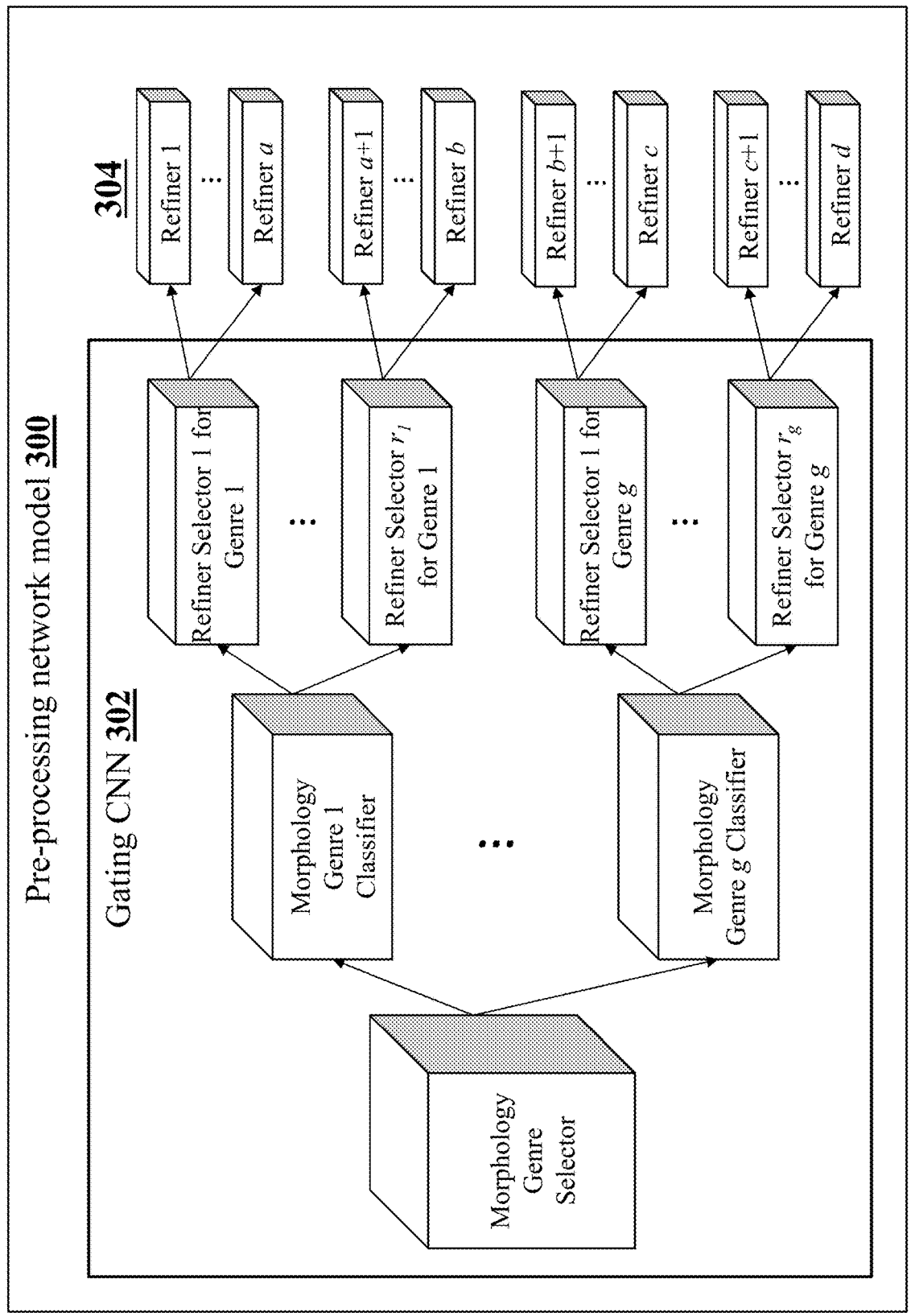
FIG. 3 illustrates a gating convolutional neural network (CNN) having multiple networks, according to an embodiment.

FIG. 3 illustrates an example of a gating convolutional neural network (CNN) 302 including multiple networks. A pre-processing network model 300 may perform pre-processing of a raw document image to maximize performance and accuracy of output of an OCR device. The pre-processing network model 300 may include a gating CNN 302 and a plurality of refiners 304. The gating CNN 302 is a gatekeeper to select an optimal refiner 304 from the plurality of refiners 304 for each input raw document image. The gating CNN 302 may select the optimal refiner 304 for each input raw document image based on optical characteristics associated with the raw document image. The selected optimal refiner then pre-processes the raw document image and provides an idealized, noise-free output, which is in the form of a clean document image. The clean document image is then fed on to the OCR device having OCR software installed thereon. The OCR device then performs OCR processing on the clean document image and provides an output, which is a display of a captured image as well as text data extracted from the image using the OCR software, such as the PDF document information organized into a format and a language that can be fed into available applications.

The gating CNN 302 may include multiple neural network models that allow the conditional computing to be applied hierarchically to the gating CNN 302 to enable more comprehensive modeling of training document images for a given computational complexity. For instance, the gating CNN 302 may include multiple neural network models such as a morphology genre selector, a morphology genre classifiers, and multiple refiner selectors for each genre to select an optimal refiner 304 from the plurality of refiners 304 for each input raw document image. The neural network models such as the morphology genre selector, the morphology genre classifiers, and the refiner selectors for each genre may be arranged in a hierarchical order with respect to each other to form the gating CNN 302 in order to process instructions to select an optimal refiner 304 from the plurality of refiners 304 for each input raw document image.

Figure 4:
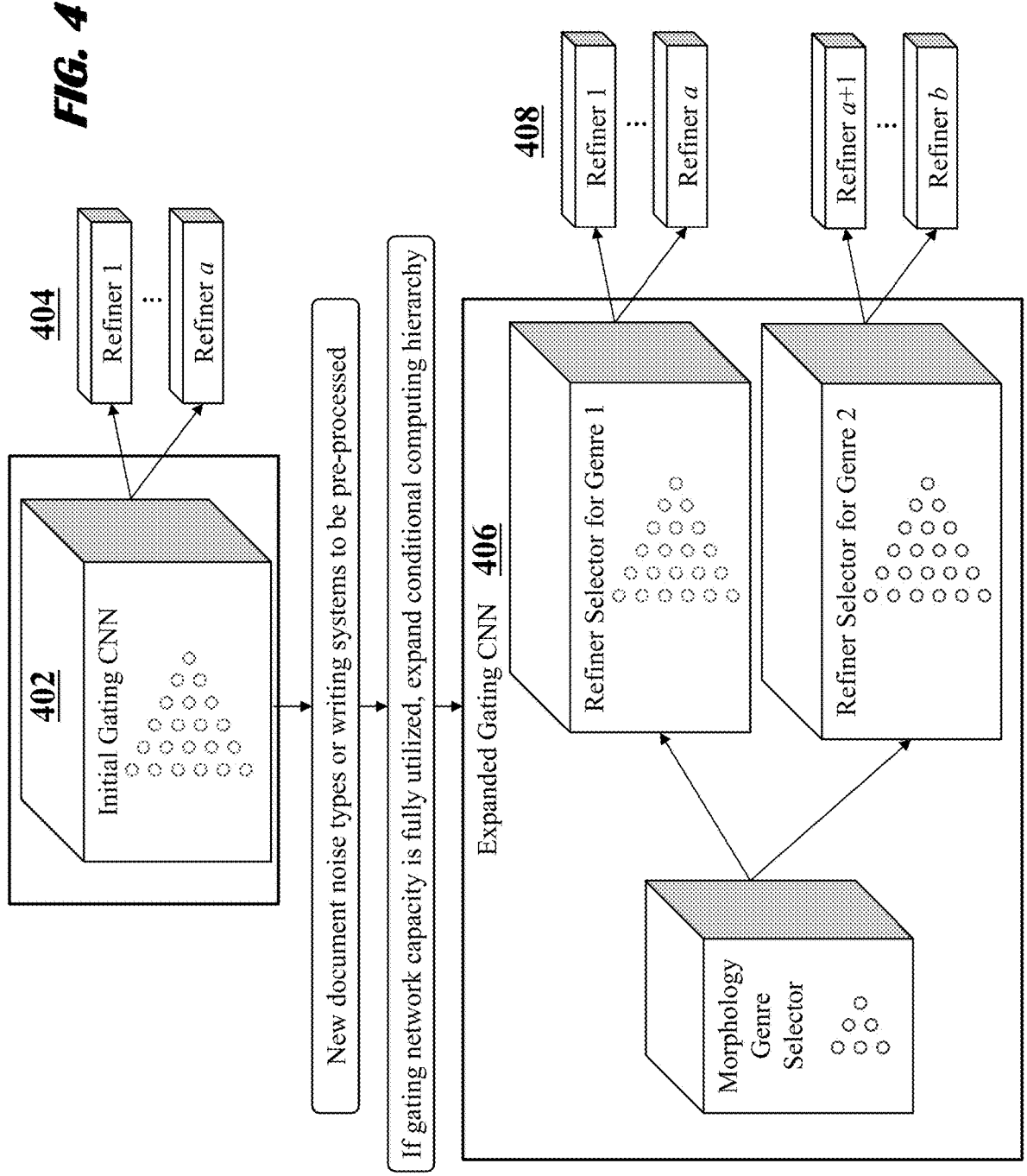
FIG. 4 illustrates an expanded version of a gating convolutional neural network (CNN), according to an embodiment.

FIG. 4 illustrates an expanded version of a gating convolutional neural network (CNN). A pre-processing network model may perform pre-processing of a raw document image to maximize performance and accuracy of output of an OCR device. The pre-processing network model may include an initial gating CNN 402 and a plurality of first refiners 404. The initial gating CNN 402 is a gatekeeper to select an optimal first refiner 404 from the plurality of first refiners 404 for each input raw document image. The initial gating CNN 402 may select the optimal first refiner 404 for each input raw document image based on optical characteristics associated with the raw document image. During operation, if the initial gating CNN 402 capacity is fully utilized while selecting the optimal first refiners 404 corresponding to each raw document image window, then the conditional computing hierarchy of the initial gating CNN 402 may be expanded, which may result into an expanded gating CNN 406. The expanded gating CNN 406 may include neural network models such as a morphology genre selector and refiner selectors for genre. The multiple neural network models such as the morphology genre selector and the refiner selectors for genre of the expanded gating CNN 406 may then be utilized to select an optimal second refiner 408 from a plurality of second refiners 408 for each input raw document image. Thus, the expanded gating CNN 406 may accommodate new document noise sources or writing systems/languages, while still using the previously learned initial gating CNN 402 models and efficiently scaling the prediction-time computational complexity by training the expanded gating CNN 406 model for the new refining tasks.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   receiving, by a computer, a raw document image containing degradation including at least one of image noise and a distortion;
   selecting, by the computer executing a first neural network, a set of one or more second neural networks trained to pre-process one or more optical characteristics of the raw document image to remove at least a portion of the degradation of the raw document image;
   generating, by the computer, a clean document image by applying the set of one or more second neural networks on the raw document image; and
   transmitting, by the computer, the clean document image to a character recognition application.

2. The method according to claim 1, further comprising identifying, by the computer, one or more optical characteristics of the raw document image, the one or more optical characteristics comprising at least one of a language and a type of degradation.

3. The method according to claim 1, further comprising:
   identifying, by the computer, one or more characters or symbols parsed from the raw document image; and
   determining, by the computer, one or more languages of the raw document image based upon comparing the one or more characters or symbols against stored alphabet information containing one or more types of letters for the corresponding one or more languages.

4. The method according to claim 1, further comprising digitally marking, by the computer, one or more portions of the raw image document to indicate one or more languages identified by the computer at the one or more portions.

5. The method according to claim 1, further comprising training, by a computer, a second neural network according to a dataset input comprising a plurality of document images having the one or more optical characteristics.

6. The method according to claim 5, wherein the computer re-trains the second neural network according to an updated dataset input comprising a new document image having at least one optical characteristic.

7. The method according to claim 1, further comprising querying, by the computer, a database configured to store a plurality of second neural networks, wherein the computer selects each second neural network in the set from the database according to the one or more optical characteristics identified in the raw document image.

8. The method according to claim 7, further comprising:
training, by the computer, a new second neural network according to a dataset input comprising a plurality of document images having at least one optical characteristic, in response to the computer failing to identify in a database a second neural network trained according to the at least one optical characteristic,
wherein the set of one or more neural networks includes the new second neural network.

9. The method according to claim 1, further comprising:
applying by the computer, a sliding window application to the raw document image to identify one or more portions of the raw document image,
wherein each respective second neural network is applied to a corresponding portion according to the one or more optical characteristics of the respective portion to generate a clean portion.

10. The method according to claim 9, further comprising stitching, by the computer, each clean portion generated by applying the set of one or more neural networks to the one or more portions to generate the clean document image.

11. A system comprising:
a non-transitory storage medium configured to store a first neural network and a plurality of second neural networks;
a processor configured to:
receive a raw document image containing degradation including at least one of image noise and a distortion;
execute the first neural network to select a set of one or more second neural networks trained to pre-process one or more optical characteristics of the raw document image to remove at least a portion of the degradation of the raw document image;
generate a clean document image by applying the set of one or more second neural networks on the raw document image; and
transmit the clean document image to a character recognition application.

12. The system according to claim 11, wherein the processor is further configured to identify one or more optical characteristics of the raw document image, the one or more optical characteristics comprising at least one of a language and a type of degradation.

13. The system according to claim 11, wherein the processor is further configured to:
identify one or more characters or symbols parsed from the raw document image; and
determine one or more languages of the raw document image based upon comparing the one or more characters or symbols against stored alphabet information containing one or more types of letters for the corresponding one or more languages.

14. The system according to claim 11, wherein the processor is further configured to digitally mark one or more portions of the raw image document to indicate one or more languages identified by the processor at the one or more portions.

15. The system according to claim 11, wherein the processor is further configured to train a second neural network according to a dataset input comprising a plurality of document images having the one or more optical characteristics.

16. The system according to claim 15, wherein the processor is further configured to re-train the second neural network according to an updated dataset input comprising a new document image having at least one optical characteristic.

17. The system according to claim 11, wherein the processor is further configured to query the plurality of second neural networks stored in the non-transitory storage medium, wherein the processor selects each second neural network in the set from the database according to the one or more optical characteristics identified in the raw document image.

18. The system according to claim 17, wherein the processor is further configured to:
train a new second neural network according to a dataset input comprising a plurality of document images having at least one optical characteristic, in response to the processor failing to identify in a database a second neural network trained according to the at least one optical characteristic,
wherein the set of one or more neural networks includes the new second neural network.

19. The system according to claim 11, wherein the processor is further configured to
apply a sliding window application to the raw document image to identify one or more portions of the raw document image,
wherein each respective second neural network is applied to a corresponding portion according to the one or more optical characteristics of the respective portion to generate a clean portion.

20. The system according to claim 19, wherein the processor is further configured to stitch each clean portion generated by applying the set of one or more neural networks to the one or more portions to generate the clean document image.

* * * * *